United States Patent Office 3,719,701
Patented Mar. 6, 1973

3,719,701
PROCESS FOR THE PREPARATION OF
UNSATURATED NITRILES
Hartwig C. Bach, Pensacola, Fla., assignor to Monsanto
Company, St. Louis, Mo.
No Drawing. Filed Nov. 23, 1970, Ser. No. 92,165
Int. Cl. C07c 121/00
U.S. Cl. 260—465.9                                    5 Claims

ABSTRACT OF THE DISCLOSURE

Nitriles of the formula

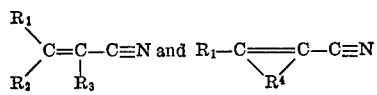

are prepared by the catalytic oxidation of an amine of the formula

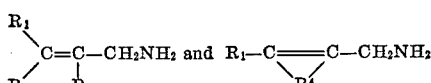

respectively, in the liquid phase at temperatures between about $-5°$ C. and about $150°$ C. where molecular oxygen is the oxidant and a cupric ion-nitrogen base complex is the catalyst. $R_1$, $R_2$ and $R_3$ represent hydrogen or monovalent organic radicals and $R^4$ represents a divalent organic radical, wherein said radicals are not oxidizable and do not inactivate the catalyst under the reaction conditions of the process.

BACKGROUND OF THE INVENTION

Polymers derived from unsaturated nitrile monomers, such as acrylonitrile, methacrylonitrile, vinylidene cyanide, etc. are well known in the art. Of this class of monomers, acrylonitrile is presently the most important and is used in making a variety of commercial products, e.g., butadiene-acrylonitrile copolymer rubbers and acrylic textile fibers.

Acrylonitrile has been manufactured by a two stage process wherein ethylene oxide and hydrogen cyanide are reacted to form ethylene cyanohydrin which is subsequently subjected to dehydration. It has also been manufactured by the direct reaction of acetylene and hydrogen cyanide. However, this latter method of manufacture has not proven promising due to the formation of by-products and the difficulties encountered in separating the acrylonitrile from the by-products, for example, the acrylonitrile tends to polymerize during the multi-stage stripping and distillation procedures.

There is a growing interest in manufacturing acrylonitrile from ammonia and hydrocarbons. One such process involves the catalytic amination of propylene at high temperatures and pressures to form propionitrile, which is then dehydrogenated. Another process involves the reaction of propylene, ammonia and oxygen at high temperatures and pressures to form acrylonitrile directly. Although potentially less expensive, the direct methods have the disadvantages of troublesome by-products and requiring expensive equipment.

British Pat. 570,835 granted to Shell Development Company on July 25, 1945, describes a process for the production of unsaturated nitriles from the corresponding unsaturated amines by reacting the amines with oxygen in the presence of a silver oxidation catalyst at a temperature of at least $450°$ C. The process is essentially a vapor phase reaction in which a mixture of the amine vapor, oxygen and an inert carrier gas are passed over a metal-alloy catalyst bed at about $500°$ C. This process has the disadvantages of requiring expensive and complex equipment and high temperatures.

An object of the present invention is to provide a simple, straightforward and economical process for the preparation of unsaturated amines.

Another object of the invention is to provide a process for the preparation of unsaturated nitriles in high yields and substantially free of undesirable by-products.

Still another object of the invention is to provide a process of the type described in the two preceding paragraphs which may be carried out continuously.

Other objects and advantages of the invention will become apparent from the following detailed description thereof.

SUMMARY OF THE INVENTION

The foregoing objects are accomplished by the process of the present invention which comprises the catalytic oxidation of unsaturated amines to the corresponding unsaturated nitriles in the liquid phase at temperatures between about $-5°$ C. and about $150°$ C. The process comprises forming a reaction mixture comprising a catalyst consisting of a cupric ion/nitrogen base complex and an unsaturated amine dissolved in a mutual solvent for said amine and catalyst, and molecular oxygen. The order of addition of the components of the reaction mixture is not critical. The overall reaction may be represented as follows:

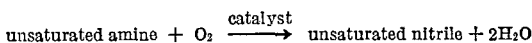

One theory for the mechanism of the reaction is that the cupric ion of the catalyst oxidizes the amine to form the corresponding unsaturated nitrile, whereby the complex is destroyed and the cupric ion is reduced to a cuprous ion or cuprous salt. In the presence of molecular oxygen the cuprous ion or salt is oxidized to a cupric ion, the catalyst (cupric ion/nitrogen base complex) is regenerated and the mechanism repeats.

DESCRIPTION OF THE PREFERRED EMBODIMENTS

The amine reactant

Suitable amines for use in the process described herein are of the structure:

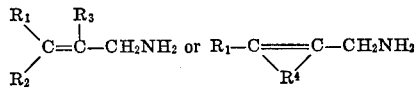

wherein $R_1$, $R_2$ and $R_3$ represent hydrogen or monovalent organic radicals and $R^4$ represents a divalent organic radical, with the proviso that said radicals are not oxidizable and do not inactivate the catalyst under the reaction conditions of the process.

Monovalent organic radicals of this description include: alkyl, olefinically unsaturated aliphatic, cycloaliphatic alkaryl, aralkyl, aromatic, heteroaromatic and halogenated hydrocarbon radicals (e.g. chlorinated and brominated hydrocarbon radicals) and radicals of the formula

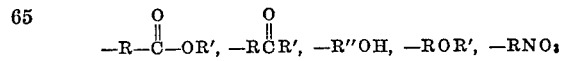

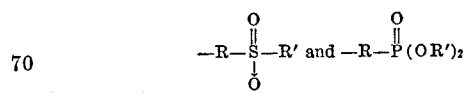

wherein R represents a divalent hydrocarbon radical, such as alkylene or phenylene, R' represents a monovalent hydrocarbon radical, such as alkyl or phenyl, and R" is alkylene or an olefinically unsaturated divalent radical. Representative monovalent radicals include:

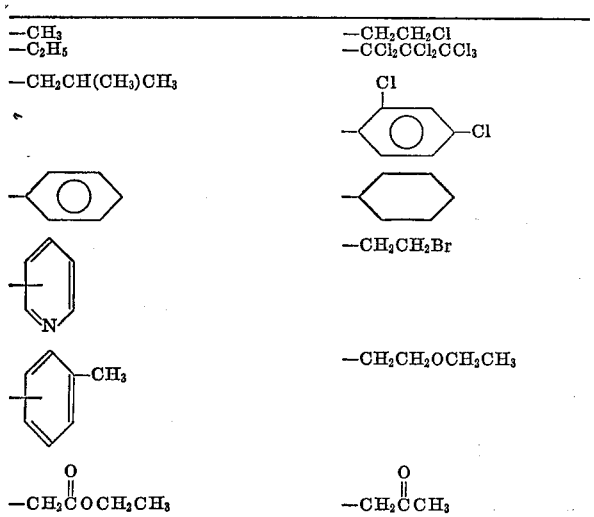

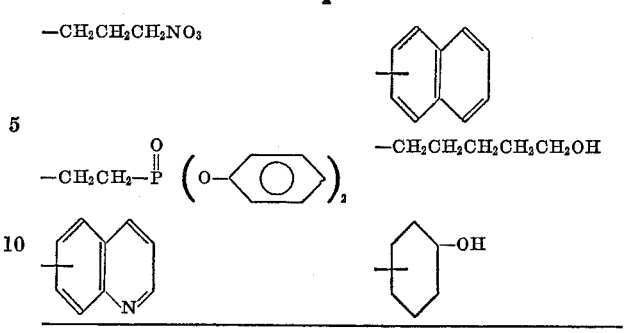

Divalent radicals of the foregoing description, i.e. $R^4$, include: —CH=CH—CH=CH—,

—CH$_2$CH$_2$CH$_2$CH$_2$—

—CH=N—CH=CH—, —O—CH=CH—CH$_2$—, —CH$_2$—CH=CH—, and the like.

Generally, the unsaturated amines used in carrying out the process of the invention contain from 3 to 24 carbon atoms. Typical examples of such unsaturated amines and the corresponding unsaturated nitriles prepared therefrom by the process of the invention are:

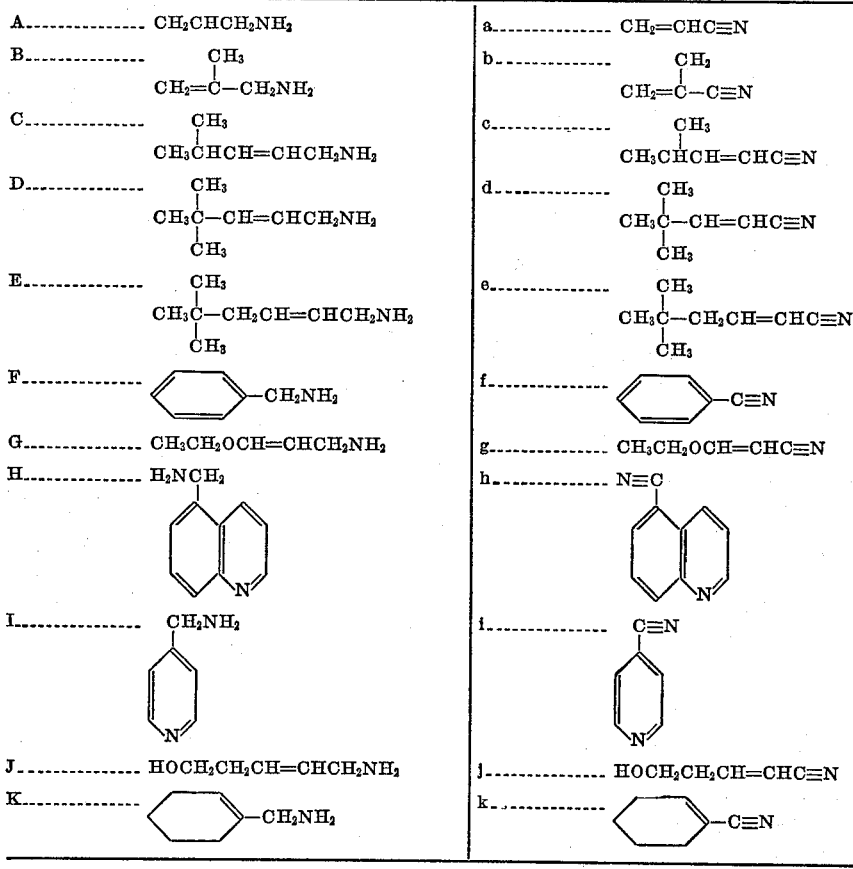

The amine reactant may consist of one amine or a mixture of amines. For example, benzonitrile and acrylonitrile may be prepared simultaneously by the process described herein by using, as the reactant, a mixture of benzylamine and allylamine.

The unsaturated amines useful in carrying out the process may be prepared by well known procedures described in the literature, e.g., by reacting the corresponding unsaturated halide, preferably the chloride or bromide with ammonia.

In carrying out the process defined herein the unsaturated amine reactant, as previoiusly indicated, must not contain substituent groups which either are oxidizable or inactivate the catalyst under the process conditions. In this context oxidizable groups are primary or secondary amine groups, phenoxy, ethynyl and hydrosulfide groups and groups which inactivate the catalyst are acid groups, such as carboxy and sulfo groups.

Catalyst

The catalyst consists of a cupric ion/nitrogen base complex. The catalyst system is preferably obtained by the oxidation of a cuprous salt in the presence of a nitrogen base.

Any cuprous salt may be used which forms a complex with the nitrogen base, is soluble in the reaction medium, and is capable of existing in the cupric state. Typical examples of such cuprous salts are cuprous chloride, cuprous bromide, cuprous sulfate, cuprous acetate, cuprous benzoate and the like. Among these, cuprous chloride is preferred, although the particular salt used in forming the complex has no effect on the product obtained.

The term nitrogen base is used herein to designate organic nitrogen compounds containing a nitrogen atom having an unshared pair of electrons which can combine with a proton, i.e., the usual designation of the term. All nitrogen bases which are not oxidized by cupric ions may be used. Suitable such nitrogen bases will be apparent to those skilled in the art and include amides such as: phosphoramides, carbonamides and sulfonamides, aliphatic and aromatic tertiary amines, cyclic tertiary amines. Specific examples of these compounds include hexamethylphosphoramide, N,N-dimethylacetamide, N,N - dimethylformamide, N,N-dimethylpropionamide, N,N-diethylacetamide, N - methylpyrrolidone, N - ethylpyrrolidone, triethylamine, tributylamine, diethylmethylamine, n-alkylpiperidines, quinolines, isoquinolines, N-alkyl morpholines and pyridine. Of these nitrogen bases pyridine, N,N-dimethylacetamide and hexamethylphosphoramide are generally preferred. Mixtures of two or more of the nitrogen bases may be used for carrying out the process.

The nitrogen bases are preferably used as the solvent for the catalyst and amine reactant. However, if desired, the nitrogen bases may be used in combination with compounds which only function as the reaction medium, e.g., inert solvents for the catalyst and amine reactant which do not interfere with the catalyst and are not oxidized to any appreciable extent thereby.

The catalyst system or cupric ion/nitrogen base complex is easily prepared by dissolving the cuprous salt (e.g. cuprous chloride) in the nitrogen base (e.g. pyridine) or mixture of bases and in the presence of an inert solvent, if desired, and then forming the complex in situ by treatment of the solution with molecular oxygen.

Mode of operation

The process is carried out in the liquid phase at temperatures ranging from between about −5 and about 150° C., and preferably from between 0° C. and 100° C. and at atmospheric or superatmospheric pressures. The process may be carried out either as a continuous process or as a batch process.

In a preferred mode of operation, molecular oxygen is used as the primary oxidant and may be introduced into the reaction medium by diffusion or injection techniques. Pure oxygen may be used, or alternatively, air or other gases containing free oxygen may be used as the oxidant. To obtain optimum yields of the desired nitrile products, a molar ratio of oxygen to amine of at least one is used and, preferably, a molar excess of oxygen to amine is used. However, higher or lower ratios may be used, if desired, since unreacted amine can be recovered and, thus, the yield of nitrile is substantially unaffected by using an excess of amine to oxygen.

When the batch process is used, the catalyst system may be prepared as indicated above, preferably at room temperature, and the unsaturated amine is added thereto under an atmosphere of oxygen with stirring for a period of time sufficient to assure complete reaction. In this respect, a gas chromatograph has been found to be an excellent means for following the progress of the reaction. After completion, the nitrile product may be separated from the reaction mixture by distillation and the reaction repeated after reactivation of the catalyst by treatment with oxygen.

Alternatively, the catalyst prepared in the manner previously described is added to a chilled solution of the unsaturated amine in an appropriate reaction medium (e.g. the nitrogen base used to prepare the catalyst) and then oxygen is added to the reaction medium until approximately the theoretical volume thereof has been consumed. This can be measured with great accuracy by using a closed system and a gas buret.

When the continuous process is used, it is preferable that the cupric ion/nitrogen base complex be prepared (with or without an inert solvent) and the unsaturated amine added thereto. The amine is added at a slow rate to the reaction mixture while simultaneously passing a stream of air, other oxidant gas mixture or molecular oxygen through the solution at a temperature and flow rate such that optimum reaction conditions are established with respect to nitrile product formation and the removal thereof from the reaction mixture by the gas sweep. The product is then removed from the exit gas stream by any well known method. The water formed as a result of the oxidation reaction may be removed from the nitrile by any suitable means such as by fractionation or the use of drying agents.

In actual operation, the optimum reaction conditions to be used in carrying out the process will depend on the reactants used, the oxidant vapor, and whether the continuous or batch method is employed. The optimum conditions for a given specific reaction and method can be readily determined by a few preliminary experiments.

To further illustrate the invention the following examples are given:

EXAMPLE I

Preparation of acrylonitrile

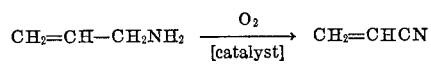

Cuprous chloride (0.25 g., 0.0025 mole) was oxidized with 14 ml. of oxygen in 10 ml. of pyridine at ambient temperature. Then, 0.143 g. (0.0025 mole) of allyl amine was added and the reaction mixture was stirred under an oxygen atmosphere for 1 hour at 25° C. and then for 2 hours at 55° C. By quantitative gas chromatography, the yield of acrylonitrile was determined to be 43.8%.

Continuous formation of acrylonitrile was observed when a stream of air was passed through an oxidized solution of cuprous chloride in pyridine, to which allyl amine was added at a dropwise rate during the reaction.

EXAMPLE II

Preparation of methacrylonitrile

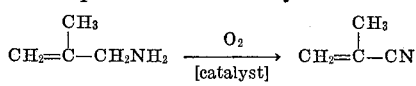

Cuprous chloride (0.5 g., 0.005 mole) was oxidized with oxygen in 20 ml. of pyridine, at ambient temperature. Then, 0.793 g. (0.0112 mole) of methallyl amine was added, and the reaction mixture was heated to 91–96° C. for 2 hours under an oxygen atmosphere. 261 ml. of oxygen (25° C., 760 mm. Hg) were absorbed. A 35.5% yield of methacrylonitrile was obtained.

EXAMPLE III

Preparation of methacrylonitrile

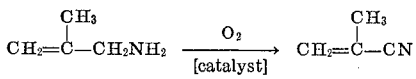

Cuprous chloride (0.25 g., 0.0025 mole) was oxidized with oxygen in 10 ml. of dimethylacetamide at ambient temperature. Then, 0.39 g. (0.0055 mole) of methallyl amine was added and the reaction mixture was stirred for 4 hours at temperatures from 58 to 80° C. under an oxygen atmosphere. A total of 108 ml. of oxygen (25° C., 760 mm. Hg) was absorbed (81% of theory). A 11% yield of methacrylonitrile was obtained.

EXAMPLE IV

Preparation of benzonitrile

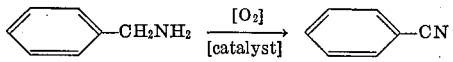

Cuprous chloride (0.25 g., 0.0025 mole) was slurried in 10 ml. of dimethylacetamide under a nitrogen atmosphere. Then, 0.268 g. (0.0025 mole) of benzylamine was added and the reaction mixture was stirred for 4 hours and 50 minutes under an oxygen atmosphere at temperatures from 66° C. to 90° C. A 70% yield of benzonitrile was obtained.

The foregoing examples illustrate the preparation of several commercially important unsaturated nitriles. Those skilled in the art will recognize however that the process has broad applications for the preparation of a wide variety of unsaturated nitriles. A major advantage of the process defined herein is that the nitrile products obtained are usually free of undesirable by-products and may be purified by simple distillation.

What is claimed is:

1. A liquid phase process for the preparation of an unsaturated nitrile of the formula

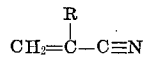

comprising catalytically oxidizing an amine of the formula

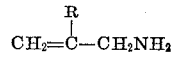

wherein R is hydrogen or a methyl group, with molecular oxygen in a solvent containing cuprous and cupric ions and maintained at a temperature between −5° C. and 150° C., said solvent being selected from the group selected from hexamethylphosphoramide, N,N-dimethylacetamide, N,N-dimethylformamide, N,N-dimethylpropionamide, N,N-diethylacetamide, N-methylpyrrolidone, N-ethylpyrrolidone, triethylamine, tributylamine, diethylmethylamine, N-alkylpiperidine, quinoline, N-alkylmorpholine, pyridine and mixtures thereof.

2. The process of claim 1, wherein said solvent is pyridine.

3. The process of claim 1, wherein said solvent is N,N-dimethylacetamide.

4. The process of claim 1, wherein R is hydrogen.

5. The process of claim 1, wherein R is a methyl group.

References Cited

UNITED STATES PATENTS 2,375,016   5/1945   Marple et al. _____ 260—465.9

OTHER REFERENCES

Sidgwick, The Organic Chemistry of Nitrogen, Clarendon Press, Oxford, p. 448.

ALAN L. ROTMAN, Primary Examiner

U.S. Cl. X.R.

260—283 CN, 294.9, 464, 465 R